United States Patent
Wang (10) Patent No.: US 6,389,751 B1
(45) Date of Patent: May 21, 2002

(54) PLANT CULTIVATING APPARATUS USING SUBIRRIGATION

(76) Inventor: Young Sung Wang, Jangmi-nogwon 36-1, Osan-ri, Dongtan-myun, Hwaseong-gun, Kyoungki-do (KR)

( * ) Notice: Subject to any disclaimer, the term of this patent is extended or adjusted under 35 U.S.C. 154(b) by 0 days.

(21) Appl. No.: 09/489,579

(22) Filed: Jan. 21, 2000

(30) Foreign Application Priority Data

| | | | |
|---|---|---|---|
| Jan. 21, 1999 | (KR) | ................................................ | 99-801 |
| Feb. 4, 1999 | (KR) | ................................................ | 99-1698 |
| Feb. 4, 1999 | (KR) | ................................................ | 99-3844 |
| Dec. 29, 1999 | (KR) | .............................................. | 99-64797 |

(51) Int. Cl.[7] ............................................. A01G 25/00
(52) U.S. Cl. ......................................................... 47/81
(58) Field of Search ................................ 47/65.8, 66.5, 47/81, 48.5, 59, 60, 62 N, 63, 82, 83, 66.6

(56) References Cited

U.S. PATENT DOCUMENTS

| | | | | |
|---|---|---|---|---|
| 3,739,522 A | * | 6/1973 | Greenbaum | 47/87 |
| 3,872,621 A | * | 3/1975 | Greenbaum | 47/87 |
| 4,213,274 A | * | 7/1980 | Skaife | 47/81 |
| 4,287,682 A | * | 9/1981 | Browne | 47/81 |
| 4,829,709 A | * | 5/1989 | Centafanti | 47/79 |
| 5,193,306 A | * | 3/1993 | Whisenant | 47/65.8 |
| 5,309,673 A | * | 5/1994 | Stover et al. | 47/59 |
| 5,502,923 A | * | 4/1996 | Bradshaw | 47/62 A |
| 5,724,768 A | * | 3/1998 | Ammann | 47/62 A |
| 5,761,847 A | * | 6/1998 | Ito et al. | 47/65.8 |
| 6,016,628 A | * | 1/2000 | Schlosser | 47/65.8 |

* cited by examiner

Primary Examiner—Charles T. Jordan
Assistant Examiner—Francis T. Palo
(74) Attorney, Agent, or Firm—Roth & Goldman, P.A.

(57) ABSTRACT

The present invention provides an apparatus and method of cultivating a plant using a subirrigating method. The apparatus includes a culture medium cell constructed in such a manner that artificial culture medium is packed in a packing material having excellent ventilation and moisture absorptivity to be shaped in a predetermined form, a planting pot which contains the culture medium cell and has holes through which a sufficient amount of nutritive solution and air pass, a cooling/heating device set in the lower portion of the culture medium cell to cool or heat the root of the plant, and a nutritive solution supplying device for automatically supplying the nutritive solution to a plant planted in the culture medium cell placed a distance from one or more nutritive solution containers, thereby supplying the nutritive solution and air to the root of the plant continuously to maintain the optimum growth environment, forcing the plant growth.

1 Claim, 8 Drawing Sheets

PLANT CULTIVATING APPARATUS USING SUBIRRIGATION

BACKGROUND OF THE INVENTION

1. Field of the Invention

The present invention relates to an apparatus and method of cultivating a plant using a subirrigating method and, more particularly, to an apparatus and method of cultivating a plant using a subirrigating method, which continuously provides the root of the plant with a nutritive solution and air, thereby maintaining their growth environments in optimum conditions.

2. Discussion of Related Art

In general, methods of cultivating ornamental plants or edible plants includes a culture medium cultivation method of planting and growing the plants in culture medium and a nutriculture method of providing the plants with a nutritive solution mixed with nutrients required for the growth of plants. The culture medium cultivation method uses general soil or artificial culture medium. Conventional methods of planting do not rapidly grow plants because their roots are not actively provided with moisture, nutritive substances and air. Accordingly, the nutriculture method of supplying the nutritive solution mixed with the nutritive substances needed for the growth of the plant is employed when a forcing culture or special culture is required. The nutriculture method includes a water culture which grows the plant, their roots directly being in contact with the nutritive solution, and a culture medium culture which plants the plant in the culture medium to be supported. In the culture medium culture, a method for supplying the nutritive solution required for the growth of the plant includes a spray irrigation of spraying water down on the leaves of the plant, a dipping method of dropping water only on the root of the plant, and a subirrigation of supplying water to the plant from the bottom of them.

In conventional spray irrigation, a portion of constituents included in the nutritive solution may affect the leaves of the plant when it comes into contact with them. Furthermore, this method must precisely control the period of supply of water required for the roots. Drip irrigation requires equipment for dropping the nutritive solution only on the root of the plant, resulting in the demand for an additional expense for the equipment. This method also has the inconvenience of precisely controlling the time of supplying water required for the root of the plant.

The subirrigating method which provides water only to the root of the plant when it is required is effective and practical because it does not need lots of equipment and allows the roots to breathe. The root of the plant should be provided with air together with water, to be able to breathe, thereby being grown normally or even rapidly. Accordingly, it is very important that the roots are supplied with sufficient air together with moisture in cultivating the plant with the nutriculture using the subirrigating method. As described above, to cultivate the plant using the subirrigation requires various environments. These environments cannot be obtained when an artificial culture medium used for the general nutriculture is employed. Thus, the subirrigating method cannot be effectively applied.

Conventionally, the plant is cultivated, being planted in the artificial culture medium filled in a container having a predetermined shape, such as planting pot or flowerpot. When it is required that the seed or seedling of the plant grows in the artificial culture medium and then they are transferred to be planted in other places, the artificial culture medium should be changed because it does not have a predetermined shape. The conventional artificial culture medium is in the bulk state as the general soil, or easily crushed even if it has a specific shape. Thus, the artificial culture medium in which the plant is planted cannot be moved. Accordingly, in case of a flower garden which produces flowering plants, the seeds or seedlings of the flowering plants should be grown in a producing district from the beginning. Thus, the flowering plants cannot be produced from the producing district until their seeds or seedlings are completely grown. This problem is caused by difficulty in moving the culture medium in which the grown flowering plants are planted to other places.

Meanwhile, the plant growth needs sufficient air as well as moisture and nutrients. That is, the subirrigating method requires time for the roots to breathe. The roots may be damaged when they do not breathe for several minutes in an extreme case although it depends on the season, temperature and kind of plant. Accordingly, the nutritive solution and air must be alternately supplied to the root of the plant with the precise supplying time in order to effectively cultivate the plant using the subirrigation.

For this, there has been proposed a method constructed in such a manner that a space through which the nutritive solution is supplied is prepared under a planting pot and the nutritive solution is provided or discharged through the space with a predetermined period of time, or planting pots where plants are planted are arranged on the nutritive solution filled in a container at a predetermined interval and a wick having a good moisture absorptiveness is inserted into the lower part of each planting pot, the lower part of the wick being dipped in the nutritive solution, to absorb the nutritive solution, thereby supplying it to the culture medium in the planting pots. This method can let the plants absorb the moisture and nutrients whenever they need them because the nutritive solution is being provided all the time. However, it cannot completely solve the problem of supplying air into the culture medium, and requires a structure for setting the planting pots into which the wicks are inserted on the nutritive solution container. In case that various plants are needed to be simultaneously planted, especially, a special structure for setting the planting pots is required.

Temperature is an essential element in the growth environment of a plant. In most cases, the plant is cultivated in a greenhouse when the temperature is lower, for example, in the winter time. Because the temperature of the root is very important in the growth of a plant, a general heating method sets the temperature of the greenhouse to the temperature of the root, required for the plant growth. Accordingly, this needs lots of expense for heating the entire greenhouse. To solve this problem, it is preferable that only the root temperature is raised while the temperature inside the greenhouse is appropriately maintained.

When plants are cultivated using a nutrient solution, the temperature of the nutrient solution increases when the temperature rises in the summer, reducing the dissolved oxygen contained in the nutrient solution. Furthermore, the respiration of the roots becomes prosperous according to high temperature due to intensive sunshine of the summer time. When the dissolved oxygen contained in the nutrient solution is insufficient, the oxygen absorbed by the root is reduced, resulting in poor growth of the root. This fades or suffocates the plant, harming its growth. In case of roses, for example, it is impossible to produce high quality roses in the summer time because of the aforementioned phenomenon. To solve this problem, there has been proposed a method of mingling the nutrient solution with hydrogen peroxide mixed with distilled water so as to provide the nutrient solution with a large amount of oxygen. However, this method is very complicated process and is not suitable for large-scale farms.

In general, the respiration of the root of a plant increases several times when the temperature rises by 10° C., and the dissolved oxygen contained in the nutritive solution is considerably reduced with increasing temperature. This results in deficiency of oxygen in the root. Specifically, the plant growth becomes remarkably poor when the dissolved oxygen at the root is less than 2 ppm, and the plant stops its growth and its root is blighted when it becomes lower than 0.5 ppm, deteriorating the productivity.

When a street or the interior of a building is decorated with flowering plants or foliage plants, planting pots containing them may be placed above the ground, having a considerable distance therebetween, or they may be placed high in multistage. In this case, it is difficult to employ the subirrigation which supplies water toward the plant root. To solve this problem, there has been used an apparatus of supplying water to planting pots placed high above a container source containing the nutritive solution using a power water pump. However, this apparatus requires a power source for the water pump and also needs additional means, such as a water level sensor, for providing an exact amount of water to the water pump all the time according to the characteristics of plants. Moreover, even if this sensor is employed, it is still difficult to precisely set the period of time during which the root of the plant can breathe while the water required for the plant growth is supplied.

Instead of using the water pump, there may be considered a method of supplying water to a plant placed high above the source of water using a wick such as cotton or sponge. However, there are limitations in guiding water from a lower place to a upper place using the cotton or sponge. This is because that water can be actually guided up to the height of 10 centimeter when the cotton or sponge is used. To effectively provide the plant, placed above the source of water by 1 meter to several meters, with an appropriate amount of water, the method of using the power water pump is employed. However, this method cannot accompany the cultivating method which provides the culture medium with air as well as nutritive solution continuously.

SUMMARY OF THE INVENTION

Accordingly, the present invention is directed to an apparatus and method of cultivating a plant using a subirrigating method that substantially obviates one or more of the problems due to limitations and disadvantages of the related art.

An object of the present invention is to provide a plant cultivating apparatus which cultivates a plant using artificial culture medium having a good porosity and drainage, the artificial culture medium being shaped in a predetermined form to be able to transfer the plant which has been grown therein to other places, the apparatus including a culture medium cell through which a nutritive solution and air can freely pass.

Another object of the present invention is to provide a plant cultivating apparatus which allows sufficient amount of air to pass through the root of a plant planted in the culture medium cell so as to simultaneously supply the nutritive solution and air to the root without cease, thereby rapidly growing the plant.

A still another object of the present invention is to provide a plant cultivating apparatus which is able to heat or cool the root of a plant as needed, and forcibly supply air required for the root to accelerate the rapid growth of the plant.

A further object of the present invention is to provide a plant cultivating apparatus which automatically supplies the nutritive solution to planting pots arranged in multistage or placed above a container containing the nutritive solution required for the plant growth, having a predetermined distance therebetween.

Another object of the present invention is to provide a plant cultivating apparatus which continuously supplies the nutritive solution and air to the root of the plant planted in the culture medium without cease, to allow the plant to grow in an optimum state.

To accomplish the objects of the present invention, there is provided a plant cultivating apparatus using a subirrigating method which supplies moisture and nutrients required for the growth of a plant from the bottom of a culture medium in which the plant is planted, the apparatus including a culture medium cell constructed in such a manner that the culture medium is composed of artificial culture medium made of coconut peat or perlite, the artificial culture medium being packed in an inner packing material first and then packed in an outer packing material, the inner packing material being made of a material through which moisture and air can smoothly pass, the outer packing material being made of a material having a predetermined degree of strength to maintain the culture medium contained therein in a predetermined shape, the outer packing material having a plurality of holes through which water passes at its lower part, the inner and outer packing materials having cuts for planting seeds or seedlings at their tops.

The culture medium cell may be used without employing any additional device, or used being contained in a planting pot according to the present invention, to thereby supply a nutritive solution and air to the root of a plant continuously. This maintains plant growth environments in which the root of the plant is not under the stress due to dryness or overhumidity, promoting the rapid growth of the plant. The planting pot according to the present invention has a plurality of holes through which the nutritive solution and air pass.

The locations where the holes are placed and the number of them depend on the size of the planting pot. In case of a small-size planting pot, for example, the holes are formed at the overall side wall of the planting pot. In case of a large-size planting pot, the holes are formed at a portion of the planting pot, ranging from its bottom to a level higher than the position corresponding to one third of its volume. The planting pot may be replaced by a vinyl basket having a plurality of holes at its side. It is preferable to decide the planting pot having the holes formed at the overall side thereof or the planting pot having the holes formed at the lower part of the side thereof, according as sufficient capillary action can occur or not in the culture medium cell contained in the planting pot.

The planting pot or culture medium cell is dipped in a nutritive solution container filled with a nutritive solution, only one third of the planting pot or culture medium cell being soaked therein, to allow the nutritive solution contained in the container to be continuously supplied to the root of the plant planted in the culture medium cell, simultaneously, to allow air to be provided to the root through the portion which is not dipped in the nutritive solution. Accordingly, the root of the plant can continuously absorb the nutritive solution and breathe without accepting the stress due to dryness or overhumidity, being maintained in the optimum growth environment, resulting in the rapid growth of the plant.

A cooling/heating pipe is placed at the lower portion of the culture medium cell contained in the planting pot to supply air to the root of the plant when large amount of air is required in the summer. Furthermore, the root of the plant can be forcibly cooled or heated using the temperature of the air provided through the cooling/heating pipe. Accordingly, the root of the plant can breathe normally even when the temperature is excessively high or low, and the temperature of the root can be controlled to be suitable for the growth, maintaining the optimum plant growth state.

Meanwhile, in case that the planting pots are placed above the nutritive solution container, having a considerable distance therebetween, or arranged in multistage, a nutritive solution supply unit for automatically supplying the solution may be set between the planting pots and nutritive solution container. The nutritive solution supply unit consists of a tube in which a high-density moisture absorbing material, and a moisture supplying device constructed in such a manner that a spiral pipe winds round the tube, the spiral pipe being filled with a high-density moisture absorbing material.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 1:
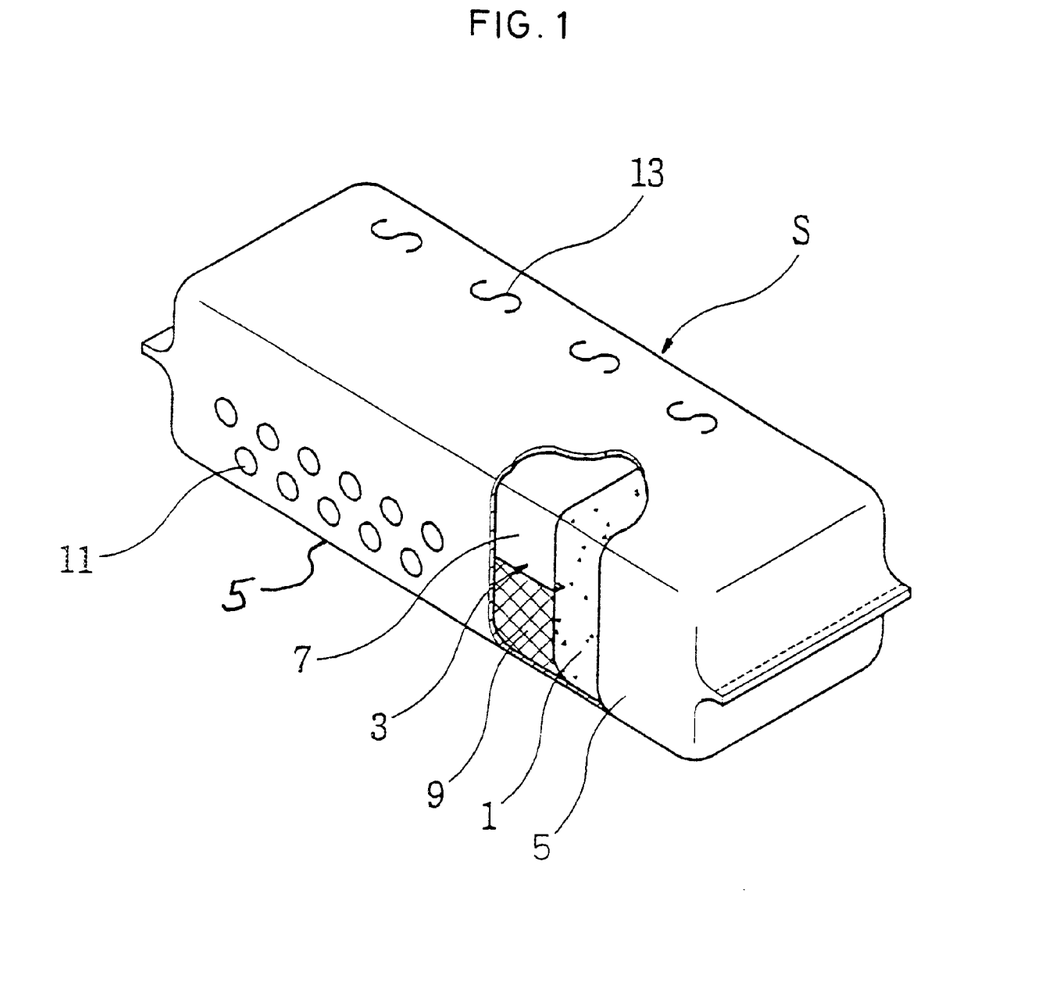
FIG. 1 is a perspective view of a culture medium cell according to an embodiment of the present invention.
Figure 2:
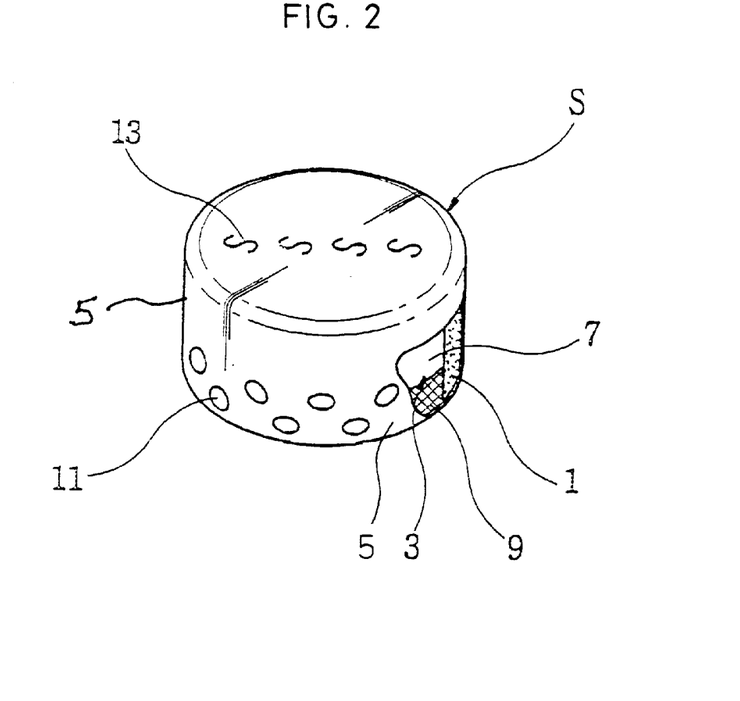
FIG. 2 is a perspective view of a culture medium cell according to another embodiment of the present invention.

FIG. 1 is a perspective view of a culture medium cell S according to an embodiment of the present invention, and FIG. 2 is a perspective view of a culture medium cell S according to another embodiment of the present invention. Referring to FIGS. 1 and 2, culture medium cell S is constructed in such a manner that culture medium 1 is packed in a packing material to have a predetermined shape. Culture medium 1 may be packed in a single fold of the packing material or, if required, it may be wrapped in an inner packing material 3 first and then packed in an outer packing material 5.

Culture medium 1 is not general soil but artificial culture soil. Though its components depend on the kind of plant, it is basically made of a compound of inorganic materials which do not chemically react to a nutritive solution mixed with water to be supplied to the plant. A compound of coconut peat or perlite is used as the main element of culture medium 1. This artificial compound culture medium can support the root of the plant, not chemically reacting to the nutritive solution, and does not harm natural environments because it uses natural materials. Furthermore, artificial culture medium 1 has excellent moisture absorptivity and drainage and large porosity so that it can create environments where the root of the plant can sufficiently be in contact with air, thereby maintaining the optimum plant growth environment, compared to general soil.

While artificial compound culture medium 1 may be contained in a flower tray or planting pot without having a predetermined shape, being in bulk, it may be packed in inner and outer packing materials 3 and 5 to be shaped in a hexahedral form of FIG. 1 or cylindrical form of FIG. 2, to thereby be able to maintain its shape even when a plant is planted therein. Inner packing material 3 may be formed of a single material or upper and lower materials 7 and 9 separated from each other. In case of two separate packing materials, upper packing material 7 is made of nonwoven fabrics to support culture medium 1 packed therein with a sufficient supporting force to maintain its shape, allowing the nutritive solution to be uniformly supplied to the plant planted in artificial culture medium 1. Lower packing material 9 may be made of fabrics having a fine gauze structure to facilitate the supply of nutritive solution and ventilation, to improve drainage, to give flexibility to the culture medium according to the growth of a plant, and to easily discharge organic matters generated during processes of growth, development and death of the root of the plant.

It is preferable that outer packing material 5 is made of a material having a predetermined degree of strength to maintain culture medium 1 packed therein in the predetermined shape. For example, it may be made of a double vinyl constructed in such manner that its outer surface is white and its inner surface is black. This double vinyl shuts out heat to maintain the humidity of the culture medium and temperature of the ground, to block weeds and mosses, preserving environment conditions suited to the growth of the root of the plant. Accordingly, it is suitable to the case where a plant is cultivated over a long period of time from its seedling to the adult plant.

Figure 3:
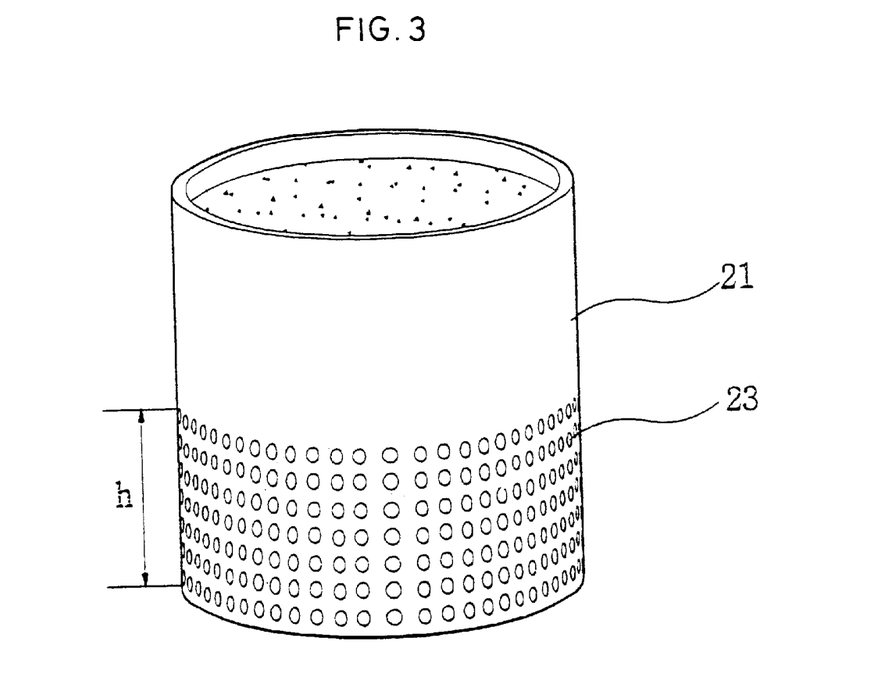
FIG. 3 is a perspective view of a planting pot according to an embodiment of the present invention.

It is preferable to make a plurality of holes 11 at the lower part of outer packing material 5 to allow the nutritive solution to easily enter and leave the culture medium there-through. Outer packing material 5 has a cut 13 formed at its top. This cut 13 is opened to expose culture medium 1 packed in the packing materials when a seedling or seed is planted in culture medium 1. As described above, the artificial culture medium in bulk shapes into culture medium cell S with a specific form, and this form is not easy to break. Accordingly, it is possible to transfer culture medium cell S when it is required to move the plant planted therein to another place after the plant is fully grown from the seedling in culture medium cell S. FIG. 3 shows a planting pot 21 according to the present invention. Planting pot 21 has a plurality of holes 23 through which air passes at its side. These holes do not ruin the basic shape of planting pot 21. The locations where holes 23 are formed and the number of them depend on the size of planting pot 21. Specifically, a small-size planting pot may have the holes at the overall side thereof. In case of a large-size planting pot, the plurality of holes are formed at a portion of the side thereof, ranging from the bottom of the planting pot to a level higher than the position corresponding to one third of the volume of the planting pot. A vinyl basket whose side has a plurality of holes may replace the planting pot.

Figure 5:
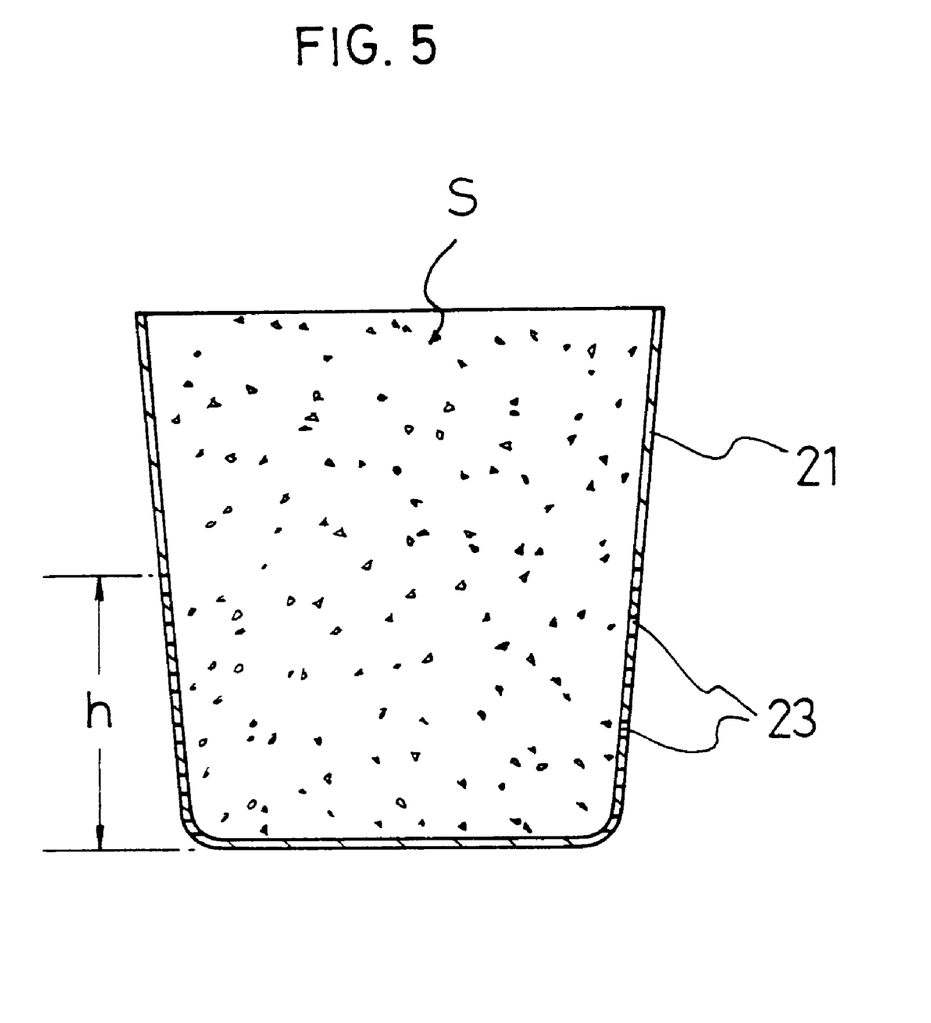
FIG. 5 is a cross-sectional view showing a state that the culture medium cell of FIG. 1 is contained in a planting pot similar to the one of FIG. 3 to cultivate a plant.
Figure 6:
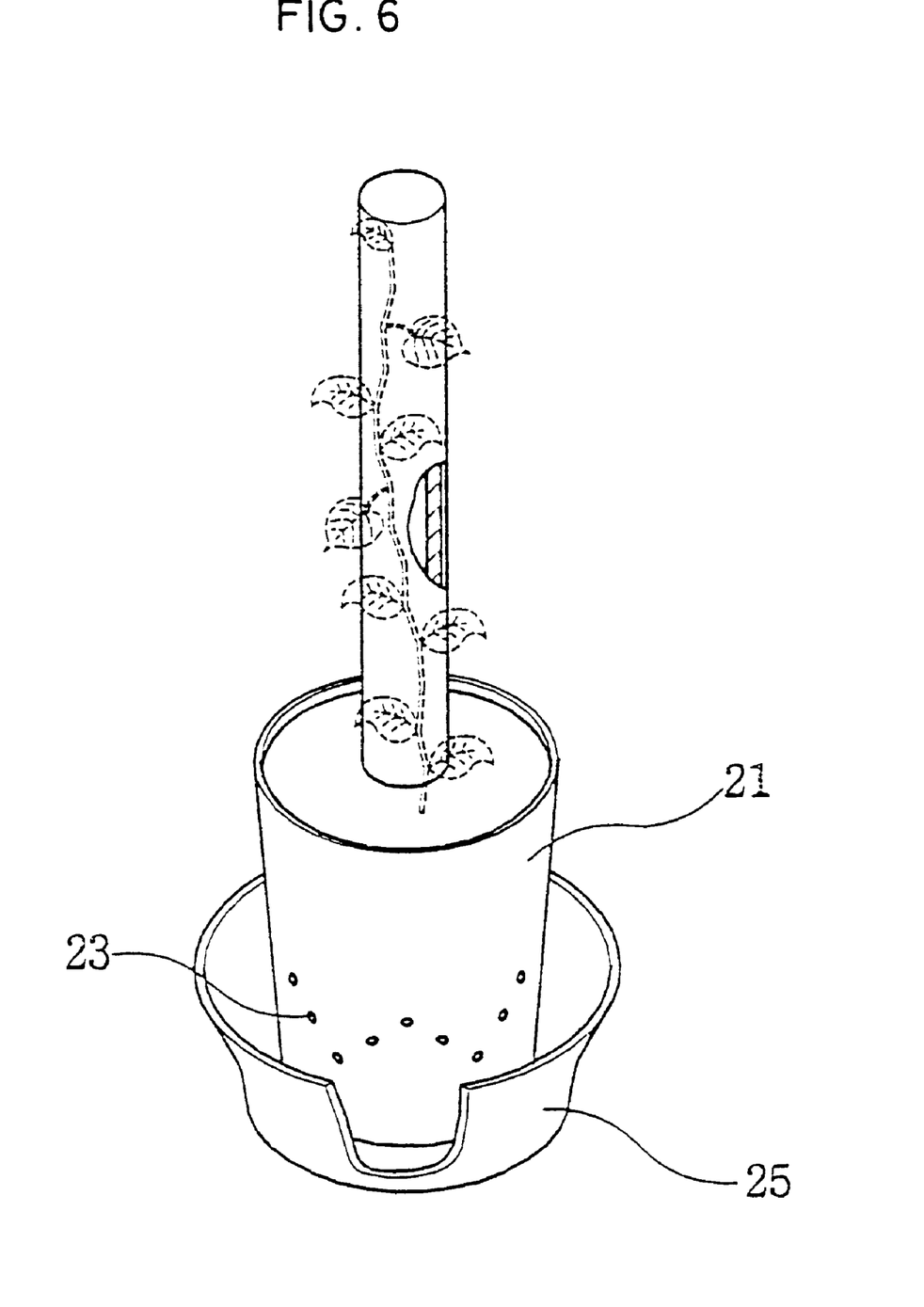
FIG. 6 is a cross-sectional view showing a support for supporting a mature plant, which consists of the culture medium cell and planting pot according to the present invention.

Though the formation of holes 23 depends on the planting pot's size and plant's size, it is preferable to decide the planting pot having the holes formed at the overall surface thereof or the planting pot having the holes formed at the lower portion of the side thereof, as described above, according as a sufficient capillary action can occur or not in the culture medium contained therein. Planting pot 21 is a very important part in the present invention. When planting pot 21 in which shaped culture medium cell S is contained, as shown in FIG. 5, is put in a separate nutritive solution container 25 filled with the nutritive solution having nutritive substances required for the growth of the plant, as shown in FIG. 6, the nutritive solution filled in container 25 is supplied to the root of the plant planted in culture medium cell S contained in ventilation planting pot 21 through holes 23.

When planting pot 21 is put in nutritive solution container 25, only the lower portion corresponding to one third of the volume of planting pot 21 is dipped in the nutritive solution filled in nutritive solution container 25, to expose holes 23 formed at the upper portion of planting pot 21 to the air. By doing so, the nutritive solution can easily enter and leave the culture medium cell through lower holes 23 while the air can freely pass through the upper ones which are not dipped in the nutritive solution. As described above, because culture medium 1 and the inner and outer packing materials have ventilation and moisture absorptivity, the nutritive solution is sufficiently supplied to culture medium cell S through holes 23 of planting pot 21.

Accordingly, the nutritive solution and air are sufficiently provided to the root of the plant planted in culture medium cell S inside planting pot 21 through holes 23 according to the capillary action. Furthermore, the nutritive solution and air are simultaneously supplied through holes 23, to be supplied to the root of the plant continuously. Thus, the plant can be cultivated while planting pot 21 is contained in the nutritive solution container all the time. As described above, the nutritive solution and air are simultaneously provided to the root of the plant without cease to allow the plant to take them when they are needed. Thus, a healthy environment where the root of the plant is not under the stress due to dryness or overhumidity can be maintained all the time, forcing the rapid growth of the plant.

From the results of experiments using the plant cultivating apparatus of the present invention, it is proven that the plant is grown to a size that is not able to be obtained using the conventional method and its growth speed is fast at least twice compared to the conventional method.

Figure 4:
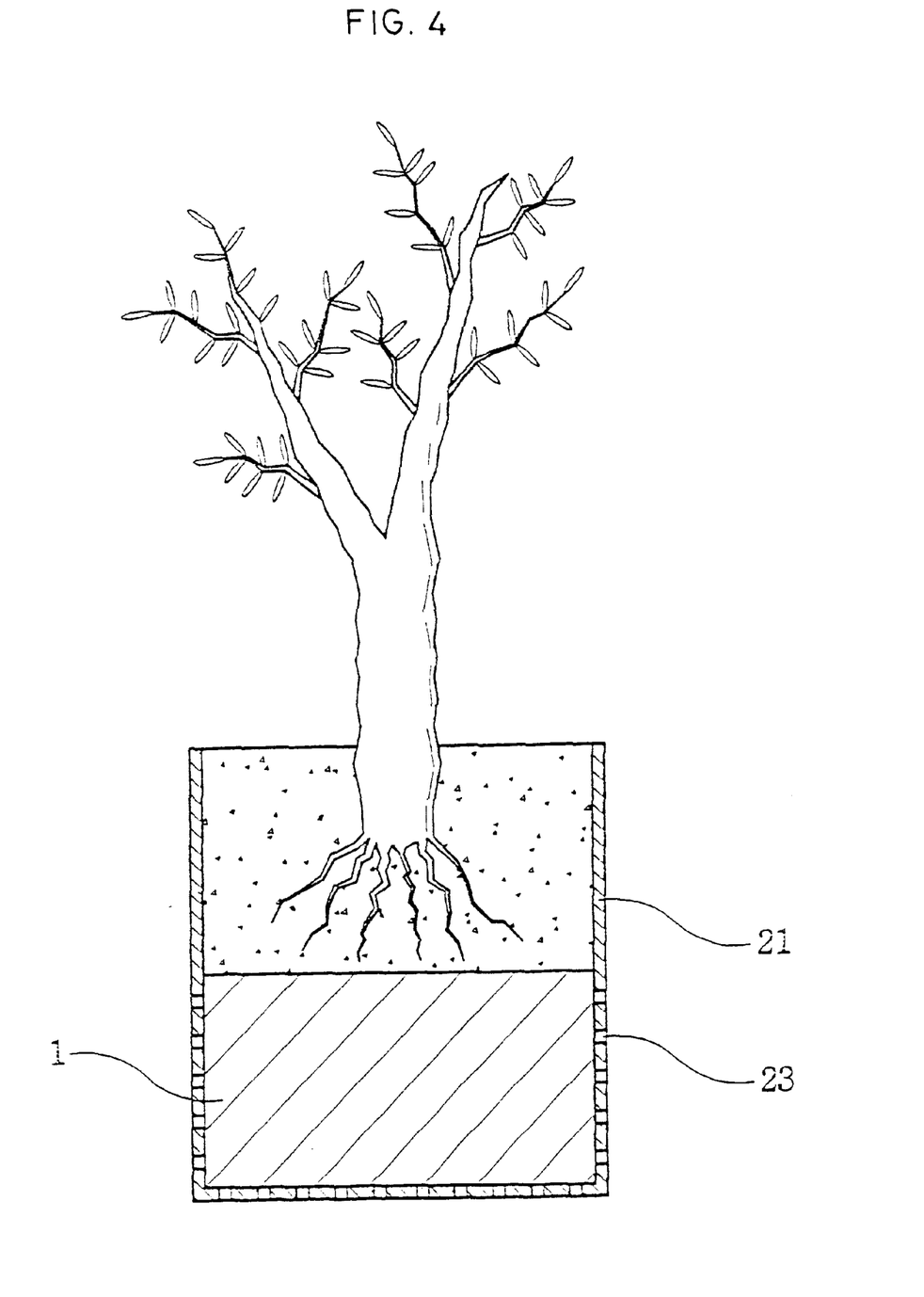
FIG. 4 is a perspective view of a planting pot according to another embodiment of the present invention.

Meanwhile, embodiments of planting pot 21 are shown in FIGS. 3 and 4. Planting pot 21 shown in FIG. 3 has plurality of holes 23 formed at a portion of its side, ranging from the bottom to the position higher than height (h) corresponding to one third of its volume. Holes 23 may be formed in vertical direction or formed zigzag as shown in FIG. 6. Otherwise, holes 23 may be formed in the shape of slit as shown in FIG. 4. In the structure of the planting pot shown in FIG. 4, it is preferable to form plurality of holes 23, having a predetermined distance therebetween. Though it is not shown, holes 23 may be uniformly formed at the overall side of the ventilation planting pot in case of a small-size planting pot.

Figure 7:
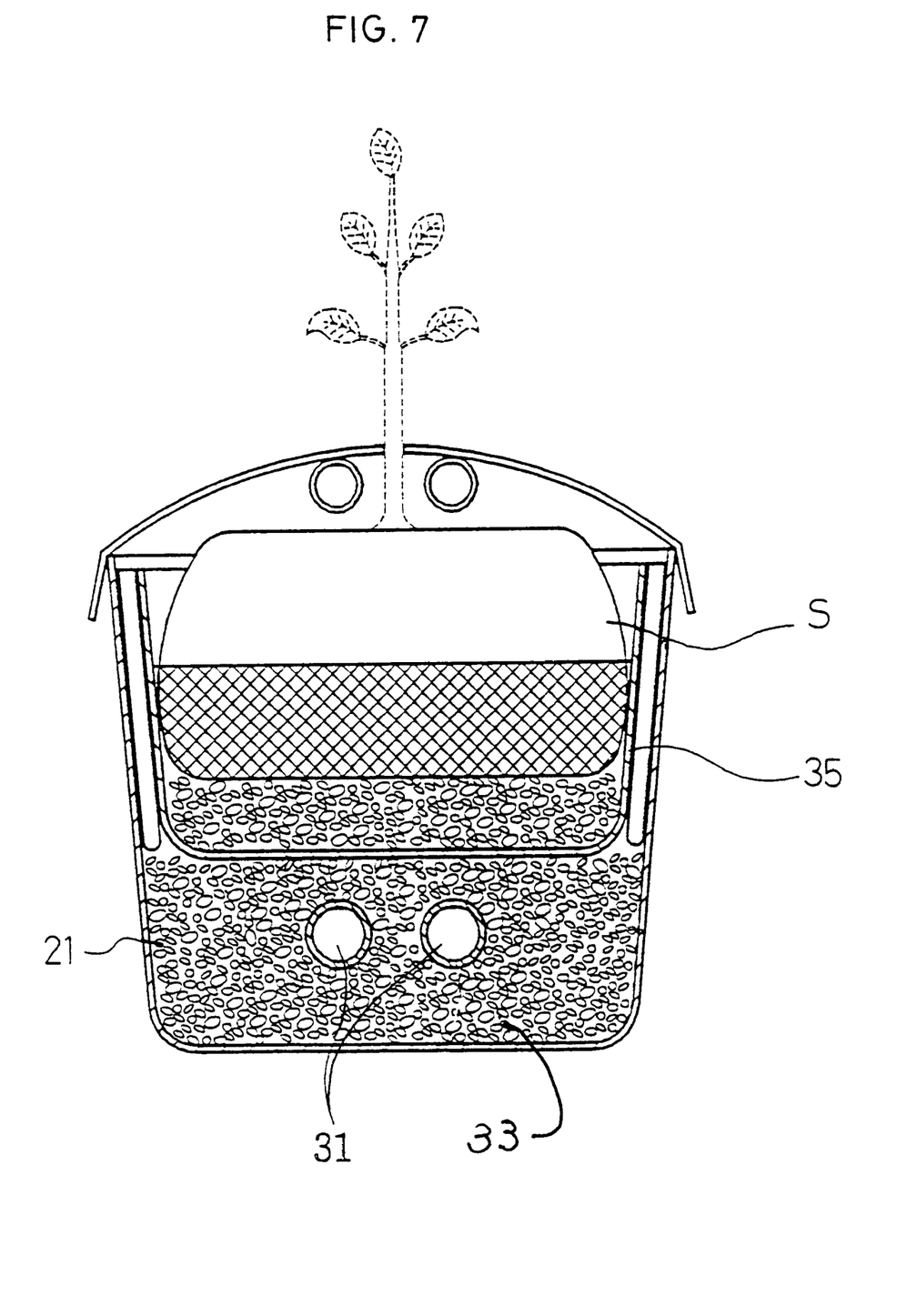
FIG. 7 is a cross-sectional view showing a state of setting a cooling/heating apparatus for cooling or heating the root of a plant at the lower portion of the culture medium cell according to the present invention.

FIG. 7 shows a structure constructed in such a manner that a cooling/healing apparatus is set inside culture medium cell S contained in planting pot 21 according to the present invention. This cooling/heating apparatus consists of cooling/heating air pipes 31 through which cooling or heating air may be selectively supplied to adjust the temperature of culture medium cell S. There may be arranged a single or several cooling/heating air pipes 31 depending on the sizes of planting pot 21 and culture medium cell S. Accordingly, in the plant cultivating apparatus in which the cooling/heating apparatus is set according to the present invention, cooling or heating air is supplied through pipe 31 when the temperature is excessively high or low, such as summer or winter time.

In the above-described structure having pipe 31, pebbles 33 may be placed between culture medium cell S and planting pot 21 to promote the ventilation. In addition, culture medium 1 can be added to culture medium cell S in case of a large-size planting pot as shown in FIG. 7. Moreover, an air guiding planting pot 35 for guiding the air supplied through pipe 31 may be set inside planting pot 21.

Figure 8:
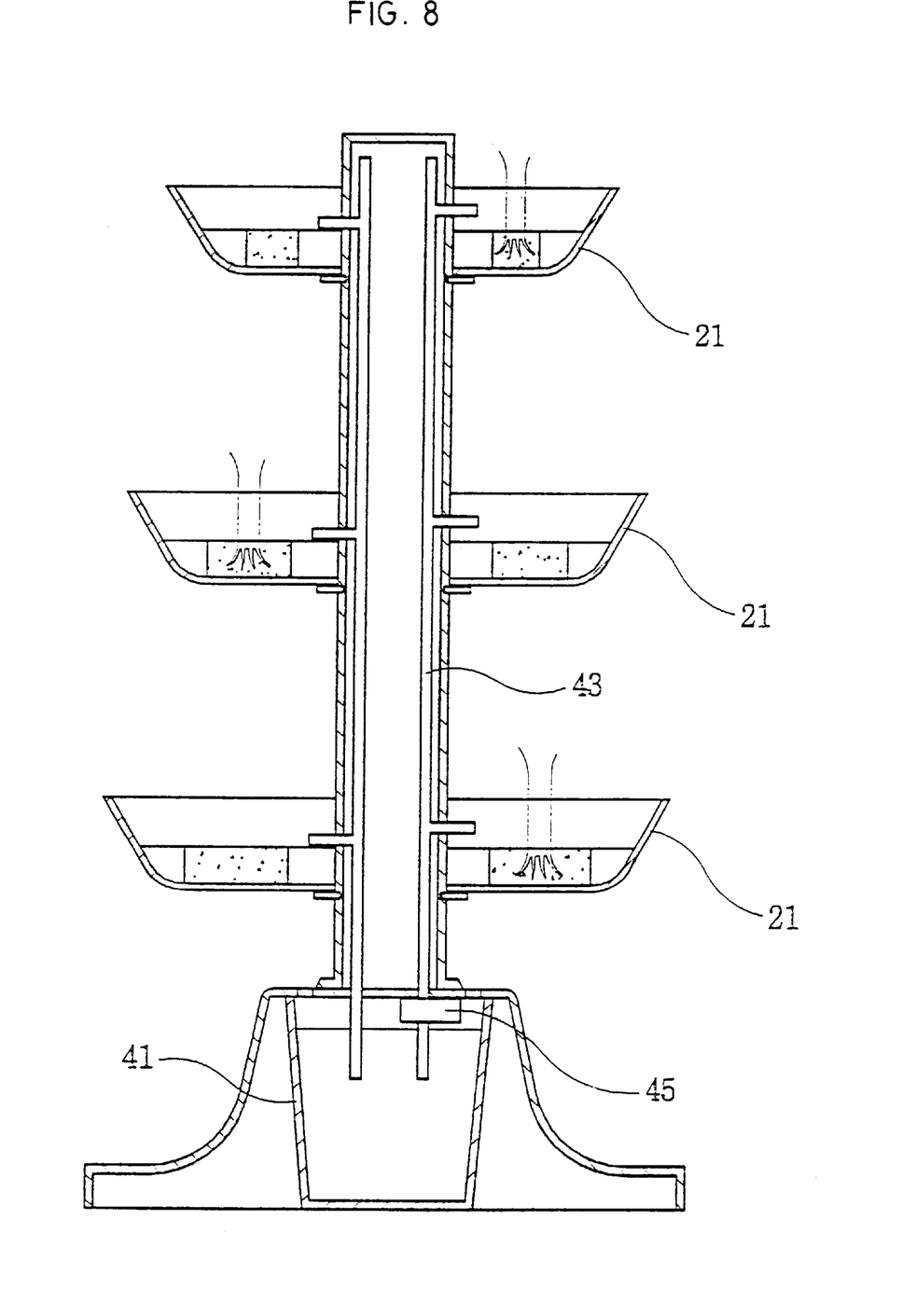
FIG. 8 is a cross-sectional view showing a nutritive solution supplying apparatus which automatically supplies a nutritive solution to the culture medium cell from a nutritive solution container when the culture medium cell is placed above the source of water, according to an embodiment of the present invention.

FIG. 8 shows a structure constructed in such a manner that planting pots 21 filled with culture medium cell S are arranged in multistage, a nutritive solution container 41 is placed at the bottom, a nutritive solution supply pipe 43 for supplying the nutritive solution is connected between nutritive solution container 41 and planting pots 21, and a motor 45 for supplying the nutritive solution is placed at the bottom of nutritive solution supply pipe 43. With this structure, motor 45 operates to pump the nutritive solution out nutritive solution container 41 to uniformly provide it to planting pots 21 arranged in multistage. Motor 45 automatically operates according to a signal applied thereto from a water level sensor (not shown) set inside planting pots 21, to supply the nutritive solution contained in nutritive solution container 41 to a predetermined level continuously.

According to the aforementioned nutritive solution supply apparatus of the present invention, even when planting pots 21 are placed having a distance from the source of nutritive solution, that is, nutritive solution container 41, the plants planted in the planting pots can absorb moisture required for their growth in the optimum state all the time with no help of man. Accordingly, the plants planted in the street or flower stands are prevented from being dried or dying due to insufficient moisture.

Figure 9:
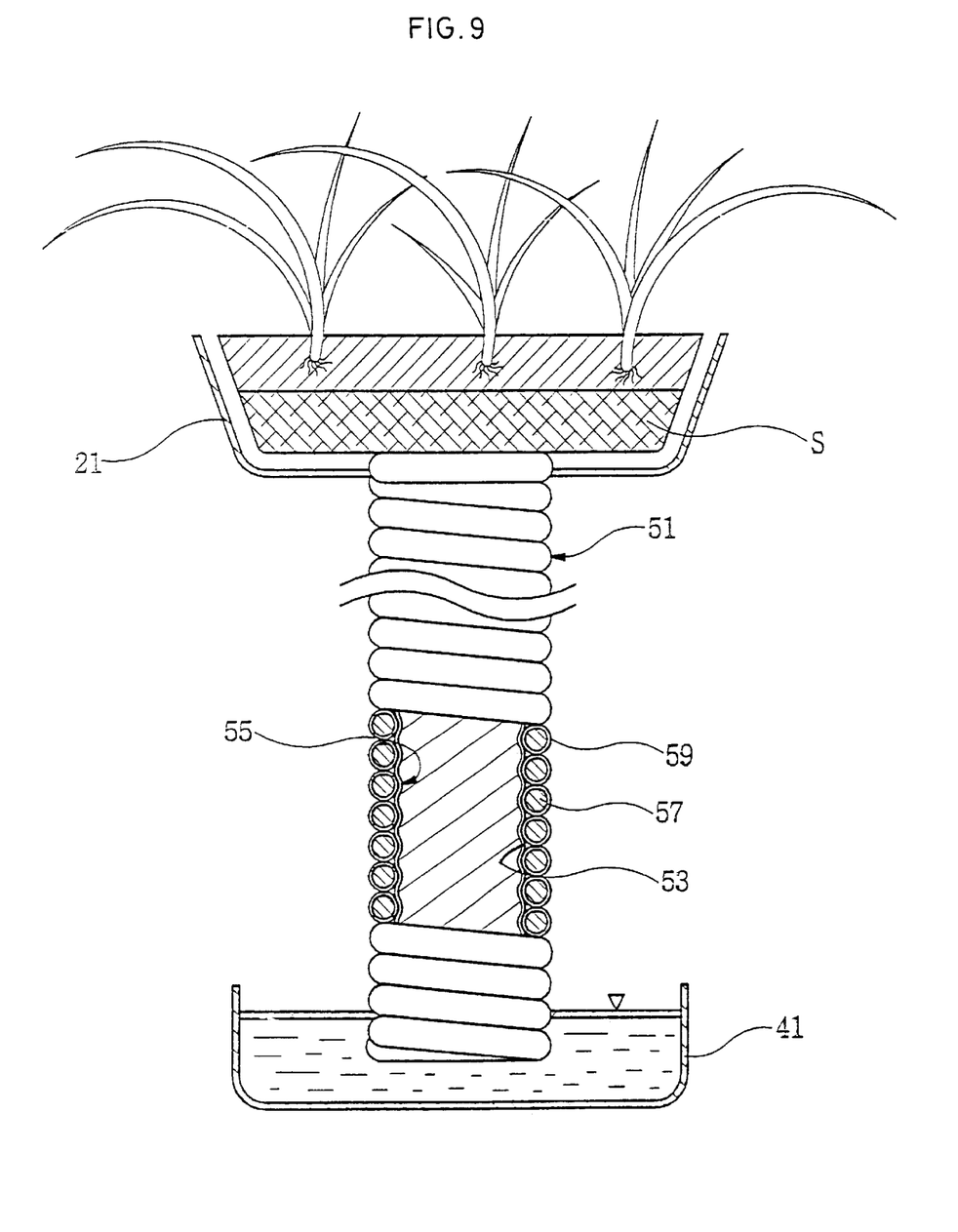
FIG. 9 is a perspective view showing a nutritive water supplying apparatus which supplies a nutritive solution to the culture medium cells arranged in multistage according to another embodiment of the present invention.

FIG. 9 is a cross-sectional view of a nutritive solution supply apparatus according to another embodiment of the present invention. In this embodiment, nutritive solution container 41 having a cover 12 is placed under planting pot 21 containing culture medium cell S, having a predetermined distance therebetween, and a nutritive solution supply unit 51 is placed between nutritive solution container 41 and planting pot 21. Nutritive solution supply unit 51 consists of a tube 55 which has spiral depressions 53 on its surface and contains a high-density moisture absorbing material 57 therein, and a spiral pipe 59 which winds round the spiral depressions and is filled with a high-density moisture absorbing material 57.

Moisture absorbing materials 53 and 57 filled in tube 55 and spiral pipe 59 are made of a material having characteristic that water absorbed therein is not easily discharged therefrom in natural state, for example, high-density sponge. While moisture absorbing material 53 is filled in tube 55 of nutritive solution supply unit 51 in a vertical form to make the nutritive solution flow vertically, that is, at an angle of 90 degrees, the gradient of spiral pipe 59 is very easy because it densely winds round tube 55 along the spiral depressions of tube 55 at a gentle angle. Accordingly, water absorbed in moisture absorbing material 57 of spiral pipe 59 is not easily drained downward because moisture absorbing materials 53 and 57 have the aforementioned structural characteristics in addition to the characteristic that water absorbed therein does not easily flow off. Thus, moisture absorbing material 57 receives the absorbing power created at the root of the plant planted in culture medium cell S to continuously transmit the nutritive solution filled in container 41 to the plant.

The upper part of spiral pipe 59 is directly inserted into culture medium 1 contained in culture medium cell S. In this moisture supply apparatus of the present invention having the above-described structure, a sufficient amount of nutritive solution is poured in nutritive solution container 41 and, simultaneously, water is poured into culture medium 1 inside planting pot 21 at the initial state. Then, moisture absorbing materials 53 and 57 filled in tube 55 and spiral pipe 59 absorb the nutritive solution in container 41 and the water poured in planting pot 21 permeates the upper part of moisture absorbing materials 53 and 57. At this state, the nutritive solution soaked in moisture absorbing materials 53 and 57 is absorbed upward according to the absorbing power created at the root of the plant planted in culture medium cell S. Here, the nutritive solution absorbed through tube 55 directly enters the lower part of culture medium cell S while the nutritive solution absorbed through spiral pipe 59 flows into culture medium cell S through a support 61 placed at the top of spiral pipe 59.

Accordingly, the nutritive solution sucked into moisture absorbing materials 53 and 57 is gradually absorbed into the root of the plant planted in culture medium cell S, not drained downward. This absorbing state is delivered to the lower parts of moisture absorbing materials 53 and 57 according to the capillary action, to allow the nutritive solution in container 41 to be absorbed into moisture absorbing materials 53 and 57. Therefore, the nutritive solution filled in nutritive solution container 41 is continuously supplied to culture medium cell S where the plant is planted, being contained in planting pot 21, according to the absorption force of the root of the plant and capillary action of moisture absorbing materials 52 and 57 without employing a separate power. Furthermore, the nutritive solution can be maintained at the optimum state because the supply state of the nutritive solution is determined by the absorption force according to the growth state of the plant planted in culture medium cell S.

The nutritive solution is supplied to the lower part of culture medium cell S through nutritive solution supply unit 51 first, and then travels to the root of the plant placed at the upper part of culture medium cell S according to the osmotic pressure of culture medium 1. This allows the root of the plant placed in the upper part of culture medium cell S, which does not directly come into contact with nutritive solution supply unit 51, to be in contact with large amount of air. Thus, the root of the plant can absorb a sufficient amount of moisture and, simultaneously, breathe a satisfactory amount of air without cease, thereby being in the optimum growth environment. Furthermore, nutritive solution supply unit 51 may be constructed in a support form to support planting pot 21, being fixed between planting pot 21 and nutritive solution container 41 without any additional structure. Otherwise, nutritive solution supply unit 51 may be supported by separate supporting means.

As described above, the apparatus and method of cultivating a plant using the subirrigating method according to the present invention has the following advantages. First of all, a plant can be easily moved together with the culture medium in which it is planted because the culture medium is packed in a unit. Accordingly, when flowering plants or specific plants are required to be continuously produce in a farm, for example, it is possible that seeds or seedlings of them are grown in a separate place and only adult plants prepared to be produced are cultivated in a greenhouse from which mature plants are produced. Therefore, the entire greenhouse can be used for preparing only the adult trees to be produced, obtaining large economic effect.

Secondly, the planting pot of the present invention allows the root of the plant to absorb moisture and nutrients required for its growth continuously and, simultaneously, to be provided with air so that the optimum growth environment where the root is not under the stress due to dryness or overhumidity can be maintained even though a separate watering process is not performed, resulting in forcing culture of plant.

Thirdly, the cooling/heating air pipe is set in the lower portion of the culture medium cell to forcingly supply air required for respiration of the root of the plant when the temperature is excessively high or low, thereby rapidly growing the plant healthy at the optimum environment. Finally, even when the planting pot is placed having a distance from the nutritive solution container, moisture required for the growth of the plant planted in the planting pot can be automatically uniformly supplied to the plant without cease, to thereby cultivate the plant in the optimum state.

It will be apparent to those skilled in the art that various modifications and variations can be made in the apparatus and method for cultivating a plant using a subirrigating method of the present invention without departing from the spirit or scope of the invention. Thus, it is intended that the present invention cover the modifications and variations of this invention provided they come within the scope of the appended claims and their equivalents.

What is claimed is:

1. A plant cultivating apparatus using sub-irrigation, comprising:

a nutritive solution container having a predetermined interior volume, and containing a nutritive solution;

a planting pot placed above said nutritive solution container and planted with at least one plant;

a nutritive solution supply unit positioned between the planting pot and nutritive solution container, the nutritive solution supply unit comprising a tube containing a high-density moisture absorbing material and a pipe spirally wound around the surface of the tube, the pipe containing a high-density moisture absorbing material.

* * * * *